UNITED STATES PATENT OFFICE.

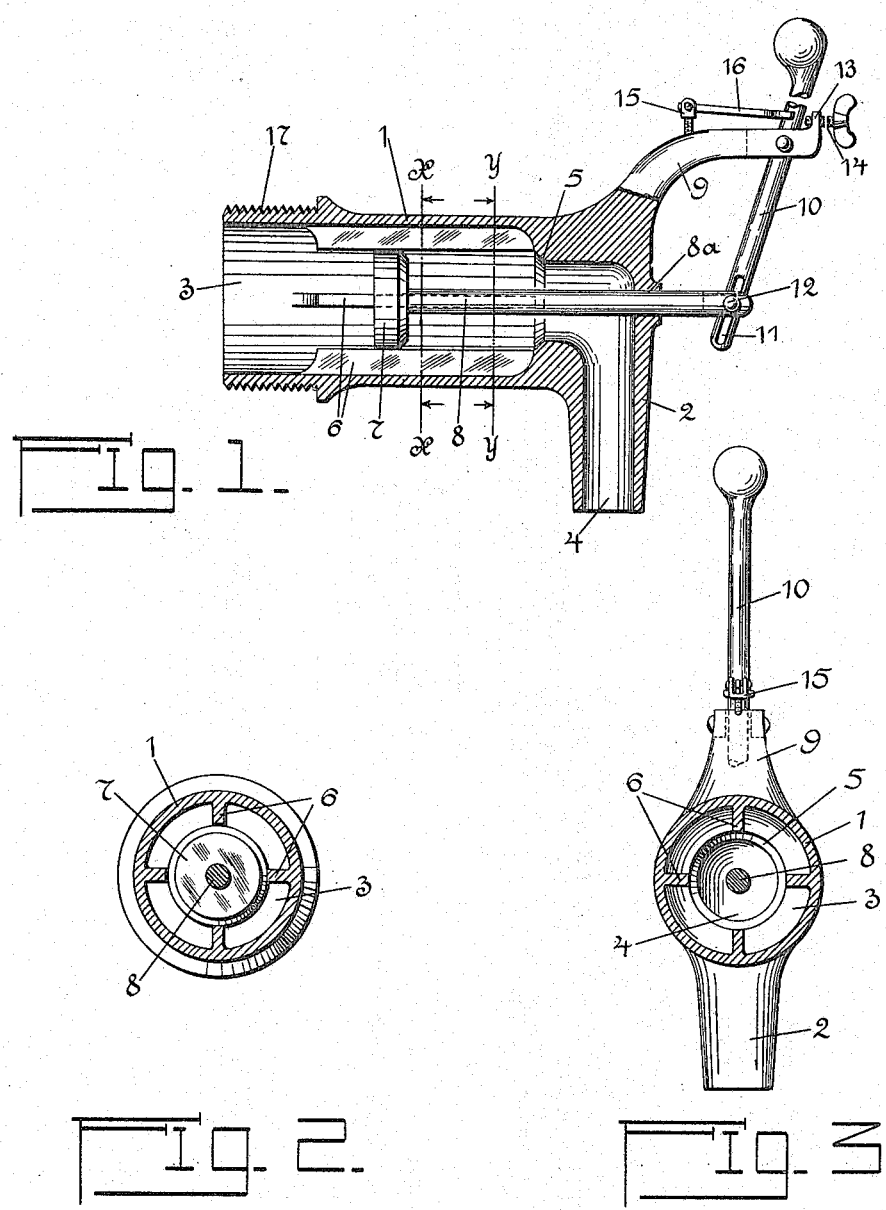

CHARLES E. McLAREN, OF GRAHAM, TEXAS.

FAUCET.

1,129,215.   Specification of Letters Patent.   Patented Feb. 23, 1915.

Application filed June 20, 1913.   Serial No. 774,730.

*To all whom it may concern:*

Be it known that I, CHARLES E. MCLAREN, citizen of the United States, residing at Graham, in the county of Young and State of Texas, have invented certain new and useful Improvements in Faucets, of which the following is a specification.

My invention relates to a new and useful faucet, and its object is to provide a faucet in which a reciprocating valve member will be employed in lieu of the rotary valve member ordinarily used.

Another object of the invention is to provide a faucet in which the valve member will tend to automatically seat itself in a closed position when not maintained open either by manual or mechanical means.

A further object is to provide a faucet so constructed that the valve member may not be easily held in a rigid relation to the walls of the valve chamber by the formation of a small amount of ice within the faucet.

Finally the object of the invention is to provide a device of the character described that will be strong, durable, simple and efficient and comparatively easy to construct, and also one, the various parts of which will not be likely to get out of working order.

With these and various other objects in view, my invention has relation to certain novel features of the construction and operation, an example of which is described in the following specification and illustrated in the accompanying drawing, wherein:

Figure 1 is a longitudinal vertical sectional view of my novel faucet, showing the valve member thereof displaced from its seat. Fig. 2 is a transverse sectional view taken upon the line X—X of Fig. 1. Fig. 3 is a transverse sectional view taken upon the line Y—Y of Fig. 1.

Referring now more particularly to the drawings wherein like reference characters designate similar parts in all the figures, the numerals 1 and 2 denote two integral members which form the body of my faucet, which members intersect each other at a right angle and are respectively formed with connected water passages 3 and 4. The passage 3, through which a fluid may enter the faucet, has a greater diameter than the fluid outlet passage 4, and at the juncture of the two passages, there is formed a valve seat 5.

The member 1 has formed on its interior face a plurality of ribs 6 extending parallel to the center line of said member and preferably four in number, spaced ninety degrees apart. The ribs 6 form guides for a reciprocating valve member 7, which when seated at 5 will cut off the flow of fluid through the faucet. When said member is displaced from its seat, a fluid entering the horizontal member of the faucet will be free to escape past the member 7, passing between the ribs 6, and discharging through the member 2. The valve member 7 is mounted fast upon one end of a vlave rod 8, which projects through the front wall of the faucet, being provided with a slide bearing in the faucet as indicated at 8ª.

The faucet is formed with an integral arm 9 which projects forwardly from the intersection of the members 1 and 2 and furnishes a pivotal support for a small lever 10, having a slot 11 in its lower end receiving a pin 12 mounted in the front end of the rod 8. By shifting the lever 10 to or from the body of the faucet between limiting positions in which it is equally divergent from a vertical line, the valve member 7 may be seated or unseated. The slot 11 will permit the lower end of the lever to undergo a certain vertical displacement entailed by the fact that it is moving in an arc, while the plunger rod moves in a horizontal line.

Upon the extreme end of the arm 9, there is formed an upstanding lug 13, in which is mounted a screw 14, which may be made to bear against the lever 10 for the purpose of holding the valve member 7 seated. It is to be understood however that said valve member will automatically seat itself when my faucet is used in conjunction with an ordinary water distribution system, this being due to the water pressure acting against the rear face of the valve member.

Upon the other extremity of the arm 9, there is formed another upstanding lug 15, upon which is pivoted one extremity of an arm 16, the other end of which may be made to abut against the lever 10 when the latter is in that position which it occupies when the valve is displaced from its seat, so that if desired, the valve may be held permanently open. The member 1 will preferably be exteriorly threaded at its open end, as indicated at 17, adapting it to be connected on a supply pipe.

Owing to the fact that there is a comparatively small area of contact between the valve member and the chamber containing the same, there is small possibility of the valve member becoming inoperative due to ice forming at said surfaces of contact.

The invention is presented as including all such modifications and changes as properly come within the scope of the following claim:

What I claim is:

A faucet comprising a body formed with a fluid passage, ribs formed upon the wall of said passage parallel to the center line thereof, a valve mounted to reciprocate in said passage guided by said ribs, closing the same in one of its limiting positions, a hand lever for actuating the valve, a set screw mounted on said body adapted to contact with said hand lever to hold same in closed-valve position, and an arm pivotally mounted on said body adapted to contact with said hand lever to hold same in open-valve position.

In testimony whereof I have signed my name to this specification in the presence of two subscribing witnesses.

CHARLES E. McLAREN.

Witnesses:
J. S. MURRAY,
JACK O. SCHLEY.

Copies of this patent may be obtained for five cents each, by addressing the "Commissioner of Patents, Washington, D. C."